(12) United States Patent
Teather

(10) Patent No.: US 8,713,163 B2
(45) Date of Patent: Apr. 29, 2014

(54) MONITORING CLOUD-RUNTIME OPERATIONS

(75) Inventor: Gregory Wray Teather, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 164 days.

(21) Appl. No.: 12/963,401

(22) Filed: Dec. 8, 2010

(65) Prior Publication Data

US 2012/0072579 A1 Mar. 22, 2012

Related U.S. Application Data

(60) Provisional application No. 61/383,919, filed on Sep. 17, 2010.

(51) Int. Cl.
*G06F 15/173* (2006.01)

(52) U.S. Cl.
USPC ............ 709/224; 709/203; 709/225; 709/226

(58) Field of Classification Search
USPC .......................................... 709/224–226, 203
See application file for complete search history.

(56) References Cited

U.S. PATENT DOCUMENTS

| 7,493,394 | B2 * | 2/2009 | Zavalkovsky et al. | ........ 709/225 |
|---|---|---|---|---|
| 7,590,669 | B2 * | 9/2009 | Yip et al. | ............... 1/1 |
| 7,996,525 | B2 * | 8/2011 | Stienhans et al. | ............. 709/224 |
| 8,140,905 | B2 * | 3/2012 | Beaty et al. | ............ 714/35 |
| 8,307,003 | B1 * | 11/2012 | Sheth et al. | ............... 707/790 |
| 8,307,362 | B1 * | 11/2012 | Gong et al. | ........................ 718/1 |
| 8,479,098 | B2 * | 7/2013 | Kimmet | ........................ 715/736 |
| 2010/0125664 | A1 | 5/2010 | Hadar | |
| 2010/0235355 | A1 | 9/2010 | Carter | |
| 2010/0250748 | A1 * | 9/2010 | Sivasubramanian et al. | . 709/226 |
| 2010/0251002 | A1 * | 9/2010 | Sivasubramanian et al. | ..... 714/2 |
| 2011/0016214 | A1 * | 1/2011 | Jackson | ........................ 709/226 |
| 2011/0055712 | A1 * | 3/2011 | Tung et al. | ..................... 715/738 |
| 2011/0078303 | A1 * | 3/2011 | Li et al. | ......................... 709/224 |
| 2011/0138034 | A1 * | 6/2011 | Brookbanks et al. | ......... 709/224 |
| 2012/0005584 | A1 * | 1/2012 | Seago et al. | .................. 715/738 |
| 2012/0016721 | A1 * | 1/2012 | Weinman | ..................... 705/7.35 |
| 2012/0042162 | A1 * | 2/2012 | Anglin et al. | ................. 713/165 |
| 2012/0047240 | A1 * | 2/2012 | Keohane et al. | .............. 709/221 |
| 2012/0060165 | A1 * | 3/2012 | Clarke | ........................... 718/104 |

OTHER PUBLICATIONS

Joseph, Joshy, msdn "Paterns for High Availability, Scalability, and Computer Power with Windows Azure", Based on information and belief available, at least as early as Oct. 1, 2010, 9 pages.

(Continued)

*Primary Examiner* — Duyen Doan
(74) *Attorney, Agent, or Firm* — Ben Tabor; David Andrews; Micky Minhas

(57) ABSTRACT

The present invention extends to methods, systems, and computer program products for monitoring cloud-runtime operations. Embodiments of the invention include an infrastructure for initiating and monitoring (e.g., asynchronous) cloud-runtime operations. In some embodiments, cloud-runtime operations are included in a sequence of operations (e.g., in a workflow) for deploying or purging cloud based resources for a customer premises. Accordingly, monitored operations include creating cloud deployments, growing cloud deployments, shrinking cloud deployments, and deleting cloud deployments. Cloud deployments can be reliably deleted when a workflow is aborted, to prevent accrual of unexpected charges.

13 Claims, 2 Drawing Sheets

(56) References Cited

OTHER PUBLICATIONS

The Rackspacecloud, "Kaavo", Based on information and belief available, at least as early as Oct. 1, 2010, 4 pages.

Lublinsky, Boris, "Designing a Cloud-oriented Enterprise Datacenter", Aug. 25, 2010, 2 pages.

Jboss Team, "Red Hat PaaS: Build Any Way, Deploy Anywhere", Aug. 25, 2010, 11 pages.

Hyperic, "Hyperic HQ 4.0 Delivers Application Performance Monitoring for Amazon Cloud Users", San Francisco, Calif. Nov. 11, 2008, 2 pages.

Amrhein, Dustin, et al., "Cloud computing for the enterprise, Part 3: Using WebSphere CloudBurst to create private clouds", Jun. 24, 2009, 12 pages.

Gridgain Cloud Computing, "GridGain 3.0" White paper—Jul. 2010, 8 pages.

\* cited by examiner

MONITORING CLOUD-RUNTIME OPERATIONS

CROSS-REFERENCE TO RELATED APPLICATIONS

This application claims the benefit of U.S. Provisional Patent Application No. 61/383,919, entitled "Automated Execution And Monitoring Of Asynchronous Cloud-Runtime Deployments", filed Sep. 17, 2010, which is incorporated herein in its entirety.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, an entity builds out an infrastructure and runs applications, such as, for example, Web services, "on-premises" within the infrastructure. In other environments, one entity uses another entity's infrastructure to run application on behalf of the entity. For example, one entity can run an application on machines in another entities data center. Running an application in another entities data center can be referred to as running an application "in the cloud".

When applications are run in the cloud, computing resources and storage resources of the data center are allocated to a user. Data centers providing cloud based resources typically require an account so that the owner of the cloud resource can bill for resource usage. As such, one desiring to use cloud based resources can establish an account, including payment information (e.g., credit card information), for that purpose. Once an account is established, setting up a system within the cloud typically includes configuring at least two components, a service (computing resources) and data (storage resources).

In some computing environments, work is performed using both on premises and cloud resources. In these "hybrid" arrangements, on premises resources and cloud resources can interoperate to assist in solving a common problem. Hybrid arrangements can exist on a temporary basis, such as, for example, when one entity supplements its own resources with resources from another entity. For example, when on premises resources are operating at or near capacity, a user of the on premises resources can request allocation of cloud resources to perform additional work. When the additional work is completed, the cloud resources are returned back to an available pool of resources for allocation to other users. The user is charged for use of any allocated resources until the resources are de-allocated. That is, the user of the on premises resources essentially rents cloud resources.

In general, allocating cloud resources for use with on premises components is a complicated, long-running, and error-prone process. Deallocating cloud resources is similarly complex. In either case, aborted attempts to change resource allocation as well as other errors can lead to cloud resources being in appropriately allocated to a user. Nonetheless, since the resources are allocated to the user, cloud-related charges continue to accrue for the user.

For example, cloud based applications typically begin with a deployment. During deployment, server instances are activated and customized for the application. This deployment phase may take minutes or hours, or may not complete at all. For example, if an application requires 15 servers, these servers are not all available immediately, but can be used as they are activated. Continuing the example, four servers may be activated and available within 10 minutes, five more may become activated and available in the next 5 minutes, five more may become activated and available in the next 5 minutes, and one may never complete the activation process and is therefore never available. However, the owner of the cloud based resources may begin charging for the servers from the moment the deployment request is received.

Manually monitoring (e.g., by an administrator/operator) the progress of a deployment and executing an abort and retry sequence for a deployment is possible. However, while this is possible, this workaround doesn't guarantee that the necessary records are kept so that the customer can put an SLA in place and obtain appropriate refunds for out of service ("OOS") incidents. Further, to manually monitor progress of an ongoing deployment or progress of purging of a deployment, various manual commands may need to be entered at specific time intervals.

BRIEF SUMMARY

The present invention extends to methods, systems, and computer program products for monitoring cloud-runtime operations. A computing component within a customer premises accesses a user entered command invoking a sequence of operations against a cloud management service. The cloud management service manages the allocation of resources within a resource cloud. The sequence of operations (e.g., representing a deployment or purge) instructs the cloud management service to alter cloud resources allocated to the customer premises. The computing component submits an operation, from among the sequence of operations, to the cloud management service.

At a specified recurring time interval, the cloud management service is polled for the status of the submitted operation automatically and without user intervention. Cloud deployment information is received from the cloud management service in response to polling the cloud management service. At least a portion of the cloud deployment information represents a status of the submitted operation. The computing component is notified of the status of the submitted operation. A next operation, from among the sequence of operations, is identified for submission to the to the cloud management service based on the status of the submitted operation.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
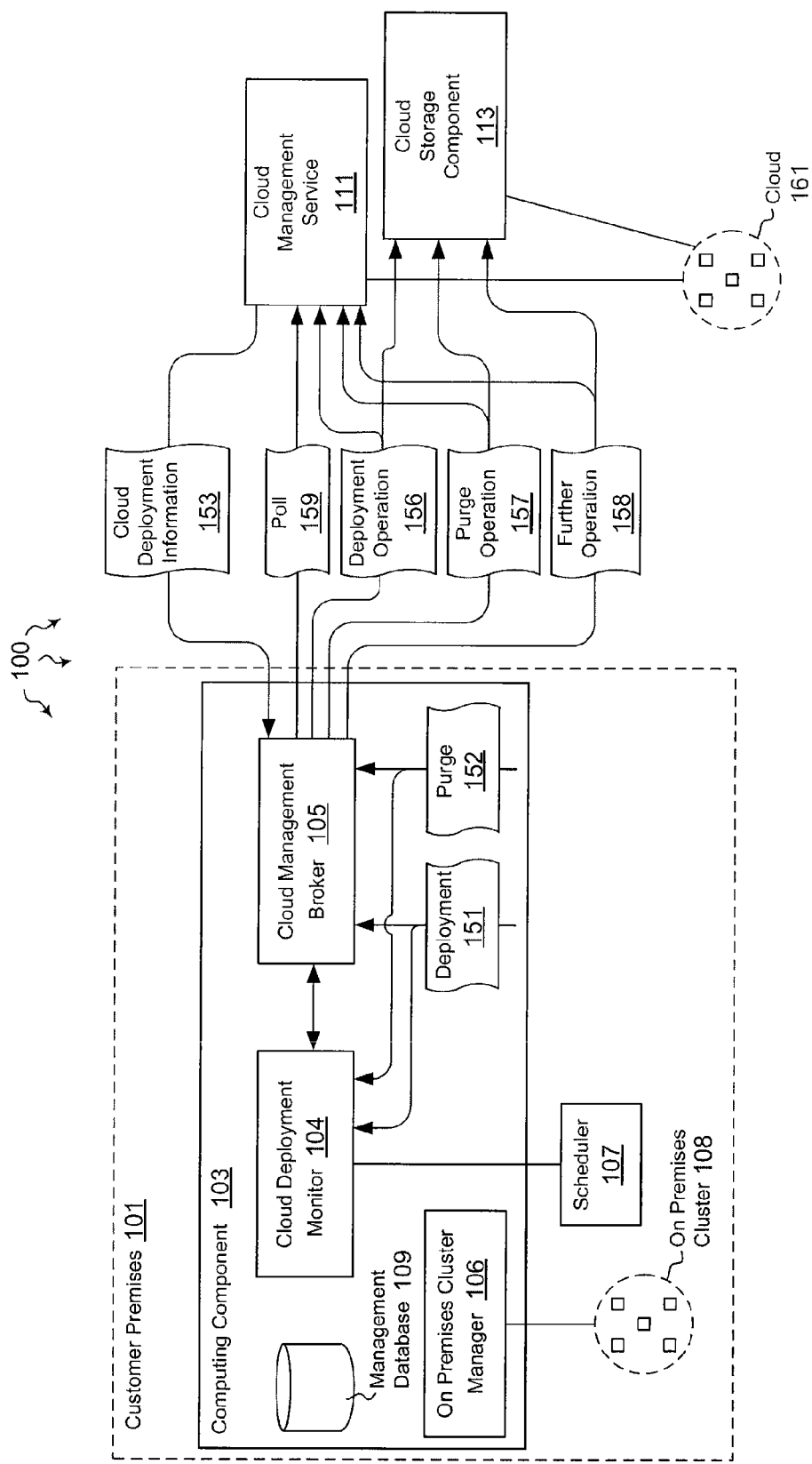
FIG. 1 illustrates an example computer architecture that facilitates monitoring cloud-runtime operations.

The present invention extends to methods, systems, and computer program products for monitoring cloud-runtime operations. A computing component within a customer premises accesses a user entered command invoking a sequence of operations against a cloud management service. The cloud management service manages the allocation of resources within a resource cloud. The sequence of operations (e.g., representing a deployment or purge) instructs the cloud management service to alter cloud resources allocated to the customer premises. The computing component submits an operation, from among the sequence of operations, to the cloud management service.

At a specified recurring time interval, the cloud management service is polled for the status of the submitted operation automatically and without user intervention. Cloud deployment information is received from the cloud management service in response to polling the cloud management service. At least a portion of the cloud deployment information represents a status of the submitted operation. The computing component is notified of the status of the submitted operation. A next operation, from among the sequence of operations, is identified for submission to the to the cloud management service based on the status of the submitted operation.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention include an infrastructure for initiating and monitoring (e.g., asynchronous) cloud-runtime operations. In some embodiments, cloud-runtime operations are included in a sequence of operations (e.g., in a workflow)

for deploying or purging cloud based resources for a customer premises. Accordingly, monitored operations include creating cloud deployments, growing cloud deployments, shrinking cloud deployments, and deleting cloud deployments. Cloud deployments can be reliably deleted when a workflow is aborted, to prevent accrual of unexpected charges.

Embodiments of the invention also include ongoing monitoring of cloud infrastructure to purge aborted/unexpected deployments. Embodiments of the invention also include ongoing monitoring of cloud infrastructure to provide notifications and results for operations. Embodiments of the invention provide resiliency to individual failures of operations.

FIG. 1 illustrates an example computer architecture 100 that facilitates automated execution and monitoring cloud-runtime operations. Referring to FIG. 1, computer architecture 100 includes customer premises 101, cloud management service 111, cloud storage component 113, and cloud 161. Customer premises 101 further includes computing component 103, scheduler 107, and on premises cluster 108. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Computing component 103 further includes cloud deployment monitor 104, cloud management broker 105, on premises cluster manager 106, and management database 109. On premises cluster manager 106 is configured to submit work for execution using resources in on premises cluster 108. A customer can enter commands through a user-interface, which are forwarded on to on premises cluster manager 106 to configure and control the use of on premises cluster 108. Alternately, schedule 107 can automatically send commands configure and control the use of on premises cluster 108 in accordance with a defined scheduled.

On premises cluster 108 can include a cluster of computer systems configured to interoperate with one another and aggregate resources together (e.g., processor, storage, and system memory) to solve (e.g., different portions of larger an/or more complex) computations that would overburden a single computer system. The cluster of computer systems can include a plurality of computer systems, such as, for example, 10s or ever 100s of computer systems, having computational and storage resources.

From time to time, a customer may also desire to use computation and storage resources in cloud 161 to supplement the use of on premises cluster 108. To establish a relationship between customer premises 101 and cloud 161, the customer can register for a subscription with cloud management service 111. In response, cloud management service 111 can return account data to the customer. Cloud management service 111 can also store account data along other credentials in an account database. Credentials can be used to access storage resources for the customer in cloud 161. Account data can include one or more of a subscription ID, a service account name, a storage account name, and a certificate for a customer.

A customer can also provide account data to computing component 103 through the user-interface. Computing component 103 can store the account data (e.g., in management database 109). Computing component 103 can use the account data on behalf the customer to facilitate the performance of work in cloud 161.

Management database 109 can contain information indicating an appropriate allocation of resources that is to result from one or more of: creating a deployment, growing a deployment, shrinking a deployment, and purging a deployment within cloud 161 and/or on premises cluster 108. Cloud deployment monitor 104 can compare information in management database 109 to cloud deployment information received from cloud management broker 105 to determine if cloud based operations are being implemented as intended. When cloud based operations are not being implemented as intended, cloud deployment monitor 104 can instruct cloud management broker 105 to take remedial/corrective actions. Remedial/corrective actions can include automatically resubmitting previously submitted commands.

To facilitate the performance of work in cloud 161, cloud management broker 105 can submit operational data along with appropriate credentials for storage to cloud management service 111 and/or cloud storage component 113. Operational data can include data (e.g., queues for accepting units of work, mapping tables to track machines, etc.) for configuring resources of cloud 161 to assist in computations also being worked on by resources in on premises cluster 108.

Cloud management broker 105 can also submit binary code along with credentials for storage within cloud 161. Subsequently, binary code can be executed within cloud 161 to instantiate computing services. Computing services can receive and process units of work to assist resources within on premises cluster 108.

In some embodiments, the submission of operational data and binary code is collectively represented as a deployment, such as, for example, deployment 151. A deployment can include a sequence of operations (e.g., a workflow) that are run against cloud management service 111 and cloud storage component 113. Different operations in a deployment can include configuring cloud based storage resources, uploading a runtime package to cloud based resources, configuring cloud based resources with appropriate parameters, starting a service on cloud based resources, etc.

Upon receiving an operation related to a deployment (e.g., creating, growing, shrinking, purging, etc.), cloud management service 111 attempts to perform the operation, such as, for example, to successfully append cloud resources to a cluster for use by computing component 103. Some operations, such as, for example, creating and starting deployments can be asynchronous operations. When asynchronous operations are successfully initiated, an overall deployment (e.g., workflow) is left in a transient state, waiting for completion.

Scheduler 107 can schedule the polling of cloud management service 111 at specified recurring time intervals (e.g., one a minute). Upon the occurrence of the time interval, scheduler 107 can notify cloud deployment monitor 104. Cloud deployment monitor 104 in turn instructs cloud management broker 105 to poll cloud management service 111 for status of any ongoing (pending) operations. Cloud management broker 105 can receive back cloud deployment information representing the status of ongoing operations. Cloud management broker 105 returns the cloud deployment information to cloud deployment monitor 104. Cloud deployment monitor 104 compares the cloud deployment information contained in management database 109. Cloud deployment monitor 104 determines if an operation has succeeded or failed based on the results of the comparison.

When an operation succeeds, cloud deployment monitor 104 notifies cloud management broker 105 to move to the next operation in a workflow. On the other hand, when an operation fails, cloud deployment monitor 104 notifies cloud management broker 105 to retry the operation. Cloud deployment monitor 104 can also clean up any leftover or unexpected deployments in the case where an overall workflow has failed.

Accordingly, cloud deployment monitor 104 communicates with cloud management service 111 through cloud management broker 105. Cloud management broker 105 contains cloud specific logic for communicating with the cloud management service 111.

Figure 2:
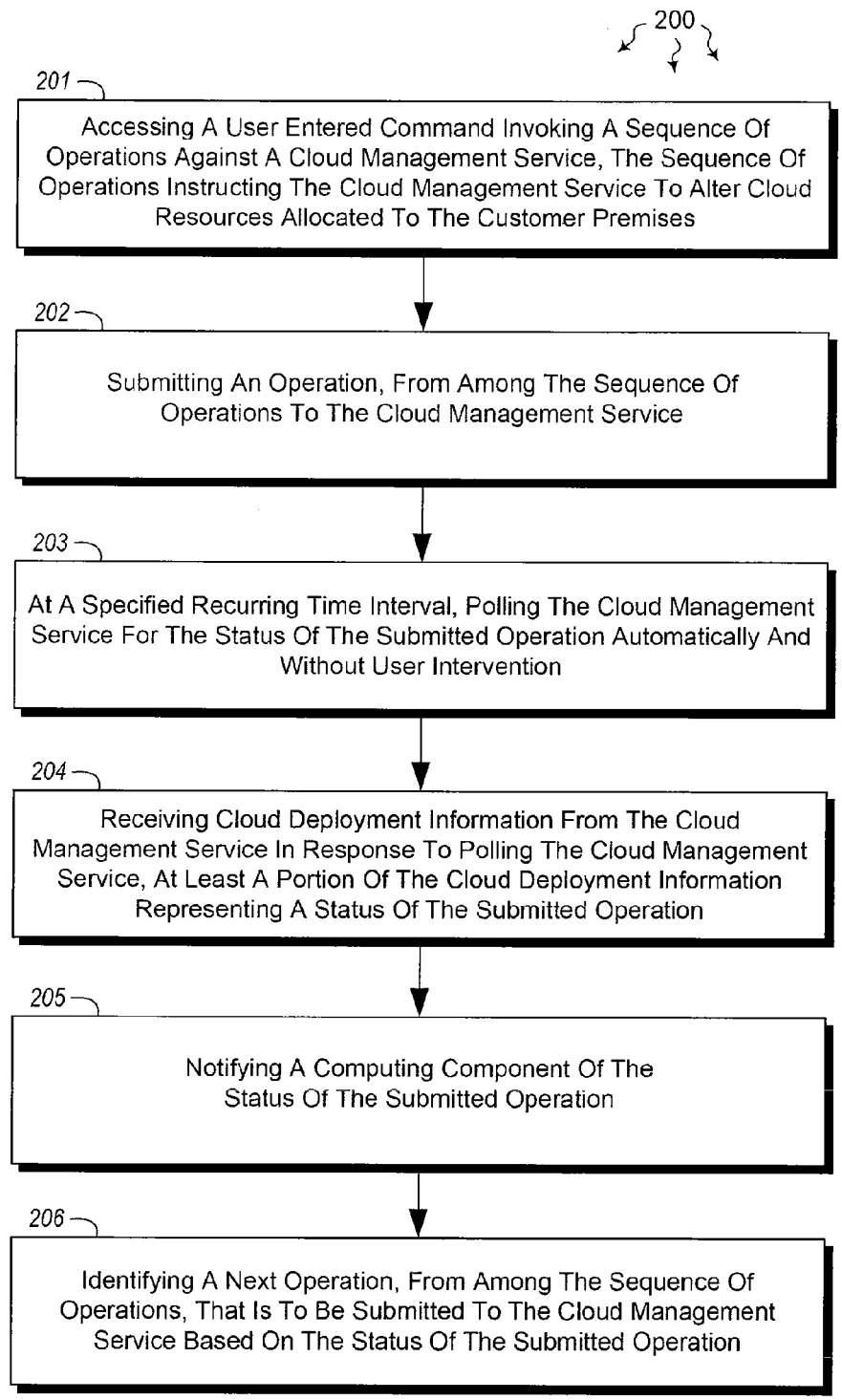
FIG. 2 illustrates a flow chart of an example method for monitoring cloud-runtime operations.

FIG. 2 illustrates a flow chart of an example method 200 for monitoring cloud-runtime operations. Method 200 will be described with respect to the components and data in computer architecture 100.

Method 200 includes an act of accessing a user entered command invoking a sequence of operations against the cloud management service, the sequence of operations instructing a cloud management service to alter cloud resources allocated to the customer premises (act 201). For example, cloud management broker 105 can access deployment 151. Deployment 151 can include a sequence of operations (e.g., a workflow). The sequence of operations can be invoked against cloud management service 111. The sequence of operations can instruct cloud management service 111 to allocate additional cloud resources to customer premises 101. For example, deployment 151 can create or grow a cloud deployment.

Method 200 includes an act of an act of submitting an operation, from among the sequence of operations, to the cloud management service (act 202). For example, cloud management broker 105 can submit deployment operation 156, from deployment 151, to cloud management service 111 and/or cloud storage component 113.

Method 200 includes an act of at a specified recurring time interval, polling the cloud management service for the status of the submitted operation automatically and without user intervention (act 203). For example, at a specified recurring time interval, scheduler 107 can request that cloud deployment monitor 104 check deployment 151. Cloud deployment monitor 104 can then instruct cloud management broker 105 to poll for the status of deployment operation 156. In response, cloud management broker 105 can submit poll 159 to cloud management service 111.

Cloud management service 111 can receive poll 159 from cloud management service. In response to receiving poll 159, cloud management service 111 can gather cloud deployment information 153 from cloud 161 (and potentially also from cloud storage component 113). Cloud deployment information 153 is related to deployment 151. Cloud management service 111 can return cloud deployment information 153 to cloud management broker 105.

Method 200 includes an act of receiving cloud deployment information from the cloud management service in response to polling the cloud management service, at least a portion of the cloud deployment information representing a status of the submitted operation (act 204). For example, cloud management broker 105 can receive cloud deployment information 153 from Cloud management service 111 in response to poll 159.

Subsequent to receiving cloud deployment information 153, cloud management broker 105 can send cloud deployment information 153 to cloud deployment monitor 104. Cloud deployment monitor 104 can access data contained in management database 109. The data can indicate an appropriate allocation of resources that is to result from completion of deployment operation 156. Cloud deployment monitor 104 can compare relevant parts of cloud deployment information 153 to the data accessed from management database 109. From the comparison, cloud deployment monitor 104 can determine the status of deployment operation 156 to be in process, has failed, has succeeded, etc.

Method 200 includes an act of notifying a computing component of the status of the submitted operation (act 205). For example, cloud deployment monitor 104 can indicate the status of deployment operation 156 to computing component 103. Computing component 103 can forward the stats to other components, such as, for example, a user interface (to make a user aware of the status).

Method 200 includes an act of identifying a next operation, from among the sequence of operations, that is to be submitted to the cloud management service based on the status of the submitted operation (act 206). For example, cloud deployment monitor 104 can determine the next operation for deployment 151 that is to be submitted to cloud management service 111. When it is determined that deployment operation 156 is still in progress, cloud deployment monitor 104 can idle until a next recurring time interval. When it is determined that deployment operation 156 has failed, cloud deployment monitor 104 can identify that deployment operation 156 is to be re-submitted to cloud management service 111. When it is determined that deployment operation 156 has succeed, cloud deployment monitor 104 can identifying that further operation 158 (from the sequence of operations in deployment 151) is to be submitted to cloud management service 111.

The further status of deployment operation 156 or further operation 158 can be check on the next recurring time interval.

In other embodiments, cloud management broker 105 accesses purge 152. Purge 152 can include a sequence of operations (e.g., a workflow). The sequence of operations can be invoked against cloud management service 111. The sequence of operations can instruct cloud management service 111 to de-allocate cloud resources from customer premises 101. For example, purge 152 can delete or shrink a cloud deployment.

Cloud management broker 105 can submit purge operation 157, from purge 152, to cloud management service 111 and/or cloud storage component 113. At a specified recurring time interval, scheduler 107 can request that cloud deployment monitor 104 check purge 152. Cloud deployment monitor 104 can then instruct cloud management broker 105 to poll for the status of purge operation 157. In response, cloud management broker 105 can submit poll 159 to cloud management service 111.

Cloud management service 111 can receive poll 159 from cloud management service. In response to receiving poll 159, cloud management service 111 can gather cloud deployment information 153 from cloud 161 (and potentially also from cloud storage component 113). Cloud deployment information 153 can be also be related to purge 152. Cloud management service 111 can return cloud deployment information 153 to cloud management broker 105.

Cloud management broker 105 can receive cloud deployment information 153 from Cloud management service 111 in response to poll 159. Subsequent to receiving cloud deployment information 153, cloud management broker 105 can send cloud deployment information 153 to cloud deployment monitor 104. Cloud deployment monitor 104 can access data contained in management database 109. The data can indicate an appropriate allocation of resources that is to result from completion of purge operation 157. Cloud deployment monitor 104 can compare relevant parts of cloud deployment information 153 to the data accessed from management database 109. From the comparison, cloud deployment monitor 104 can determine the status of purge operation 157 to be in process, has failed, has succeeded, etc.

Deployment monitor 104 can indicate the status of purge operation 157 to computing component 103. Computing component 103 can forward the stats to other components, such as, for example, a user interface (to make a user aware of the status).

Cloud deployment monitor 104 can determine the next operation for purge 152 that is to be submitted to cloud management service 111. When it is determined that purge operation 157 is still in progress, cloud deployment monitor 104 can idle until a next recurring time interval. When it is determined that purge operation 157 has failed, cloud deployment monitor 104 can identify that purge operation 157 is to be re-submitted to cloud management service 111. When it is determined that purge operation 157 has succeed, cloud deployment monitor 104 can identifying that further operation 158 (from the sequence of operations in purge 152) is to be submitted to cloud management service 111.

In some embodiments, computing component 103 utilizes resources in a plurality of different resource clouds. Computing component 103 can include a cloud management broker for each different resource cloud. Cloud deployment monitor 104 can interface with each cloud management broker. Management database 109 can store information related to deployments in the plurality of different resource clouds. Cloud deployment monitor 104 can used the stored information for comparison to cloud deployment information received from the plurality of different resource clouds. From the comparisons, cloud deployment monitor 104 can determine when retry operations or move next operations in each of the plurality of different resource clouds.

In some embodiments, computing component 103 is a High Performance Computing ("HPC") component (e.g., a head node for on premises cluster 108). As such, work submitted for execution (to on premises cluster 108 and/or to cloud 161) can be part of scientific or other computationally intensive operations. In these embodiments, operational data can be HPC operational data and binary code can be HPC binary code. Based on HPC operational data and HPC binary code, HPC services can run within cloud 161. The HPC services can include queues for accepting units of HPC work, mapping tables to track machines, etc.

Thus, a deployment monitor can be a multi-functional component hosted within high performance computing services. The deployment monitor monitors HPC service run in a resource cloud. The deployment monitor monitors can:

1) Monitor in-progress Deployments (polling a resource cloud and the Job Scheduler for updates) and notifying ongoing operations 2) Stop orphaned deployments 3) Garbage collect unused storage Further, a deployment monitor can be instantiated on multiple high performance computing services and invoked in clusters that are actively participating with the cloud.

Each time the deployment monitor is dispatched, the deployment monitor can proceed through the following workflow:

1) Handle the orphan deployments—Poll the cloud for information about current deployments—if there are active deployments that correspond to existing Node Templates, but no HPC nodes correspond to those templates (probably because they were deleted), stop the deployment 2) Handle deployment notifications—Query database efficiently (using a ChangeFinder) for ongoing StartNode operations. For each ongoing operation, check for the cached OperationID in the database. Query cloud for updates on the Operation. Notify all asynchronous sub-operations if the deployment has failed. Query each target node's Reachability property (which uses existing code to receive events from the scheduler). Notify individual asynchronous sub-operations if the deployment has succeeded.

3) Delete unused storage—Delete scheduler entities corresponding to stopped or aborted deployments. Delete other monitoring/SOA entities if there if there are no active deployments in the system The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At an on premises computer system including a processor and system memory, the on premises computer system also including a computing component having a management database and a cloud deployment monitor, the on premises computer system being within a customer premises and connected to an on premises cluster, an external cloud management service that manages an external resource cloud, a method for monitoring cloud resource allocation for the customer premises, the method comprising:

an act of the on premises computer system accessing a user entered command invoking a cloud deployment comprising a sequence of operations against the external cloud management service, the sequence of operations of the cloud deployment instructing the external cloud management service to alter cloud resources of the external resource cloud that are allocated to the customer premises;

an act of the on premises computer system submitting an operation, from among the sequence of operations of the cloud deployment, to the external cloud management service;

subsequent to submitting the operation and at a specified recurring time interval, an act of the on premises computer system polling the external cloud management service for the status of the submitted operation automatically and without user intervention;

an act of the on premises computer system receiving cloud deployment information from the external cloud management service in response to the on premises computer system polling the external cloud management service, at least a portion of the cloud deployment information representing a status of completion of the submitted operation by the external cloud management service;

based on the received cloud deployment information, an act of the on premises computer system notifying the computing component of the status of completion of the submitted operation; and based on the status of completion of the submitted operation, an act of the on premises computer system identifying a next action to take, including:

when the status of completion of the submitted operation indicates that the submitted operation is still in progress, idling until a recurring time interval;

when the status of completion of the submitted operation indicates that the submitted operation has failed, identifying the submitted operation is to be re-submitted to the external cloud management service;

when the status of completion of the submitted operation indicates that the submitted operation has completed, identifying a further operation in the sequence of operations of the cloud deployment for submission to the external cloud management service; and when the status of completion of the submitted operation indicates that cloud deployment has failed, identifying one or more purge operations for submission to the external cloud management service, the one or more purge operations instructing the external cloud management service to de-allocate one or more cloud resources for the customer premises.

2. The method as recited in claim 1, wherein the act of accessing a user entered command invoking a sequence of operations against the external cloud management service comprises an act of accessing a deployment command.

3. The method as recited in claim 1, wherein the act of accessing a user entered command invoking a sequence of operations against the external cloud management service comprises an act of accessing a workflow with operations for deploying additional external cloud resources to the customer premises.

4. The method as recited in claim 1, wherein the act of accessing a user entered command invoking a sequence of operations against the external cloud management service comprises an act of accessing a purge command.

5. The method as recited in claim 1, wherein the act of accessing a user entered command invoking a sequence of operations against the external cloud management service comprises an act of accessing a workflow with operations for de-allocating deployed external cloud resources from the customer premises.

6. The method as recited in claim 1, further comprising an act of determining the status of the submitted operation by comparing the cloud deployment information to information in a management database prior to notifying the computing component of the status of the submitted operation.

7. A computer program product for use at an on premises computer system, the on premises computer system including a computing component having a management database and a cloud deployment monitor, the on premises computer system being within a customer premises and connected to an on premises cluster, an external cloud management service that manages an external resource cloud, the computer program product for implementing a method for monitoring cloud resource allocation for the customer premises, the computer program product comprising one or more computer storage devices having stored thereon computer-executable instructions, that when executed at a processor, cause the on premises computer system to perform the method, including the following:

access a user entered command invoking a cloud deployment comprising a sequence of operations against the external cloud management service, the sequence of operations of the cloud deployment instructing the external cloud management service to alter cloud resources of the external resource cloud that are allocated to the customer premises;

submit an operation, from among the sequence of operations of the cloud deployment, to the external cloud management service;

subsequent to submitting the operation and at a specified recurring time interval, poll the external cloud management service for the status of the submitted operation automatically and without user intervention;

receive cloud deployment information from the external cloud management service in response to the on premises computer system polling the external cloud management service, at least a portion of the cloud deployment information representing a status of completion of the submitted operation by the external cloud management service;

based on the received cloud deployment information, notify the computing component of the status of completion of the submitted operation; and based on the status of completion of the submitted operation, identify a next action to take, including:

when the status of completion of the submitted operation indicates that the submitted operation is still in progress, idling until a recurring time interval;

when the status of completion of the submitted operation indicates that the submitted operation has failed, identifying the submitted operation is to be re-submitted to the external cloud management service;

when the status of completion of the submitted operation indicates that the submitted operation has completed, identifying a further operation in the sequence of operations of the cloud deployment for submission to the external cloud management service; and when the status of completion of the submitted operation indicates that cloud deployment has failed, identifying one or more purge operations for submission to the external cloud management service, the one or more purge operations instructing the external cloud management service to de-allocate one or more cloud resources for the customer premises.

8. The computer program product as recited in claim 7, wherein computer-executable instructions, that when executed, cause the on premises computer system to access a user entered command invoking a sequence of operations against the external cloud management service comprise computer-executable instructions, that when executed, cause the on premises computer system to create a deployment or expand an existing deployment.

9. The computer program product as recited in claim 7, wherein computer-executable instructions, that when executed, cause the on premises computer system to access a user entered command invoking a sequence of operations against the external cloud management service comprise computer-executable instructions, that when executed, cause the on premises computer system to delete a deployment or shrink an existing deployment.

10. The computer program product as recited in claim 7, further comprising computer-executable instructions, that when executed, cause the on premises computer system to determine the status of the submitted operation by comparing the cloud deployment information to information in a management database prior to notifying the computing component of the status of the submitted operation.

11. A computer system, comprising:

one or more processors; and one or more computer storage devices having stored thereon computer-executable instruction that, when executed by the one or more processors, cause the computer system to implement a method for monitoring cloud resource allocation for a customer premises, wherein the method includes:

an act of accessing a user entered command invoking a cloud deployment comprising a sequence of operations against an external cloud management service, the sequence of operations of the cloud deployment instructing the external cloud management service to alter the allocation of external cloud resources for a premises to implement a high performance computing service;

an act of submitting an operation to the external cloud management service, the submitted operation selected from the sequence of operations of the cloud deployment;

subsequent to submitting the operation and at specified intervals, automatically and without user intervention:

an act of identifying the operation that is currently attempting to execute within the external resource cloud;

an act of polling the external cloud management service to check the progress of the operation;

an act of determining the status of completion of the identified operation from the external cloud management service based on the polling;

an act of notifying the computing component of the status of completion of the identified operation; and based on the status of completion of the submitted operation, an act of identifying a next action to take, including:

when the status of completion of the submitted operation indicates that the submitted operation is still in progress, idling until a recurring time interval;

when the status of completion of the submitted operation indicates that the submitted operation has failed, identifying the submitted operation is to be re-submitted to the external cloud management service;

when the status of completion of the submitted operation indicates that the submitted operation has completed, identifying a further operation in the sequence of operations of the cloud deployment for submission to the external cloud management service; and when the status of completion of the submitted operation indicates that cloud deployment has failed, identifying one or more purge operations for submission to the external cloud management service, the one or more purge operations instructing the external cloud management service to de-allocate one or more cloud resources for the customer premises.

12. The computer system as recited in claim 11, wherein the act of accessing a user entered command invoking a sequence of operations comprises an act of accessing a user entered command for handling deployment notifications.

13. The computer system as recited in claim 11, wherein the act of accessing a user entered command invoking a sequence of operations comprises an act of accessing a user entered command for deleting unused storage in the resource cloud.

\* \* \* \* \*